Nov. 1, 1927.

H. U. BOLLINGER

FOOD FORMING MACHINE

Filed Sept. 9, 1925

Inventor
H. U. Bollinger
By D. Swift
Attorney

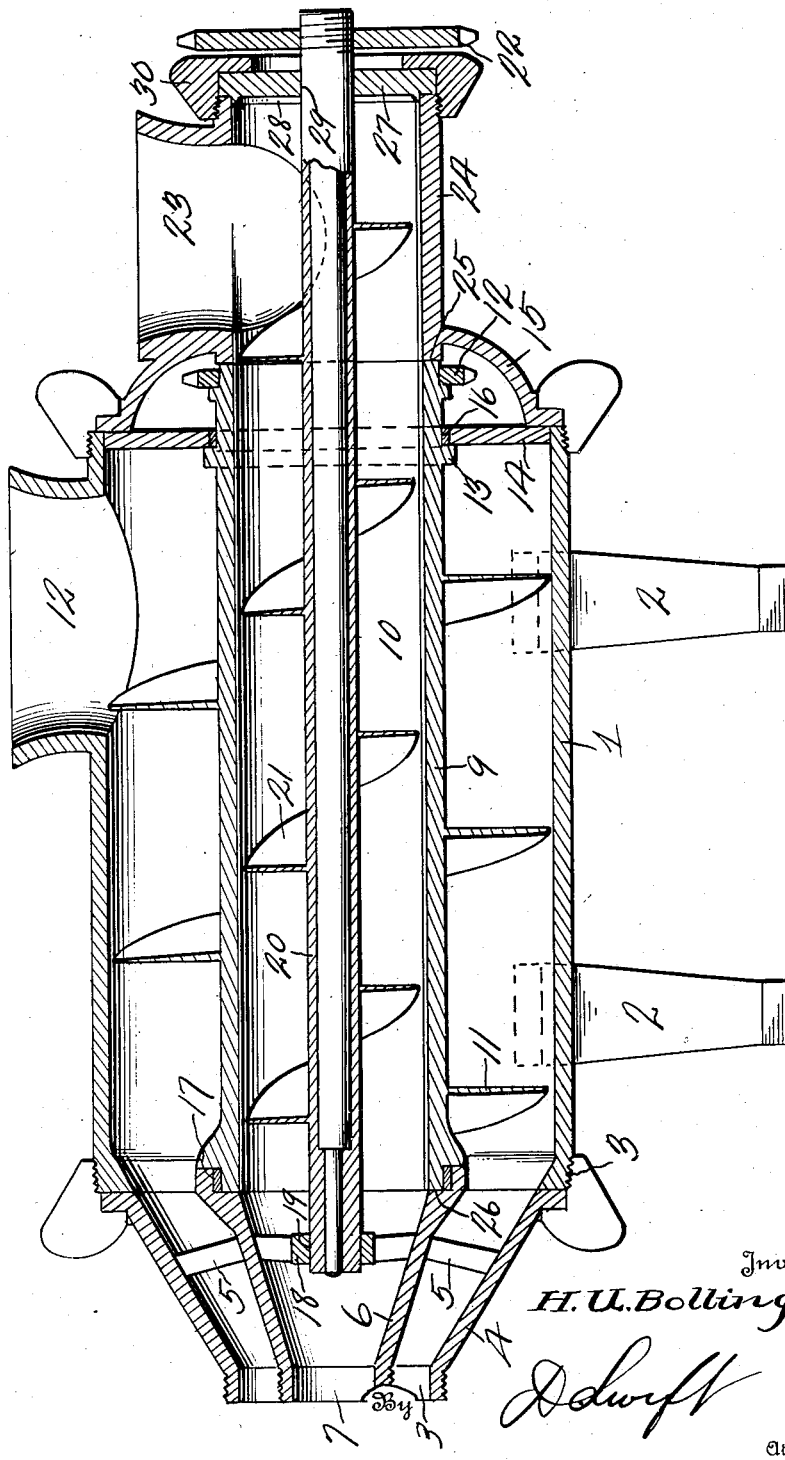

Patented Nov. 1, 1927.

1,647,683

UNITED STATES PATENT OFFICE.

HARRY U. BOLLINGER, OF PORTOLA, CALIFORNIA, ASSIGNOR OF TWO-THIRDS TO SAMUEL T. AXTELL, OF SACRAMENTO, CALIFORNIA.

FOOD-FORMING MACHINE.

Application filed September 9, 1925. Serial No. 55,294.

The invention relates to food forming machines, and has for its object to provide a device of this character having a stationary casing in which is rotatably mounted a sleeve having a worm on the outer periphery thereof, which when the sleeve is rotated, will force food, for instance rice through a discharge opening surrounding a discharge opening from the rotatable sleeve and a worm rotatably mounted within the rotatable sleeve, and rotatable independent of the sleeve for discharging and forcing food through the sleeve discharge opening whereby fish or any other kind of food will be discharged simultaneously with a covering food, for instance rice, and an elongated roll of food may be formed having a covering of one kind of food and a core of another kind.

A further object is to provide means whereby the feeding worms for the roll covering and the core may be operated at different speeds, thereby allowing the feeding operation to be accurately regulated.

A further object is to provide a removable cap at the discharge end of the device, which cap has a bearing for supporting one end of the tubular sleeve and the inner feed worm, and a removable cap carried by the other end of the casing and holding a bearing disc in position within the casing and in a bearing of which bearing disc, one end of the sleeve is rotatably mounted.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 3 is a vertical longitudinal sectional view through the machine.

Figure 1:
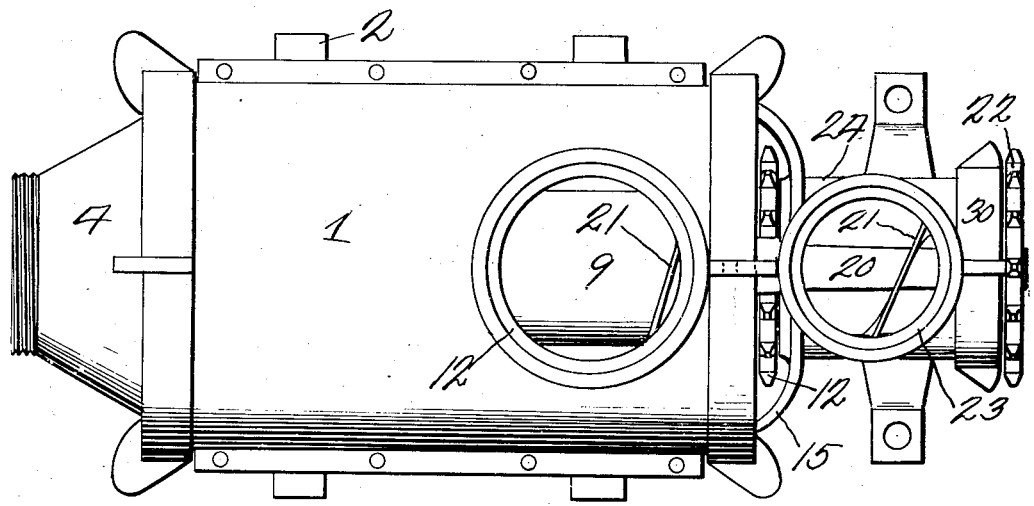
Figure 1 is a top plan view of the machine.
Figure 2:
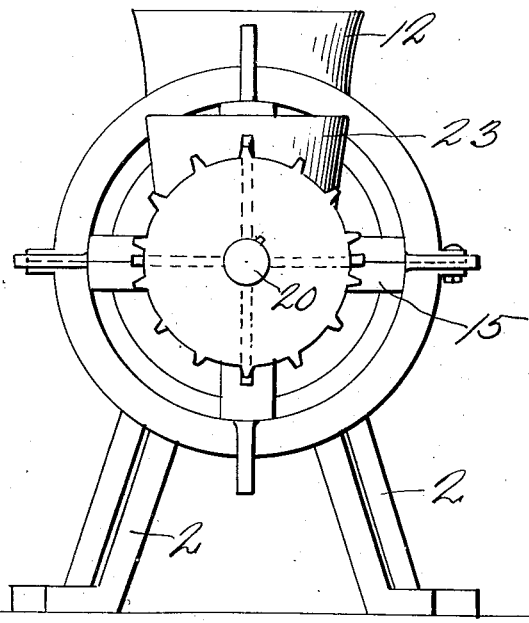
Figure 2 is a rear elevation of the machine.

Referring to the drawings, the numeral 1 designates a cylindrical casing, which is stationary, and is provided with supporting legs 2, for supporting the same on a table or the like. The ends of the casing 1 are open, and one of said ends has threaded thereon at 3 a removable frusto conically shaped discharge spout 4, which discharge spout has supported therein by means of arms 5 a core discharging frusto conically shaped spout 6, thereby forming a round discharge port 7 and an annular discharge port 8 surrounding the discharge port 7. Rotatably mounted within the casing 1 is a sleeve 9 having a chamber 10 extending entirely therethrough, and its outer periphery provided with a feed worm 11, whereby food placed into the casing 1 through the hopper 12 may be forced rearwardly through the funnel shaped spout 4, and through the annular discharge port 8, that is when the sleeve 9 is rotated from any suitable source of power connected to the sprocket 12 carried by one end of the sleeve. Sleeve 9 is provided with an annular rib 13 against which a bearing ring 14 engages, and which bearing ring is disposed within the end of the cylinder 1 and is held therein by means of the spider 15 which cooperates with the outer side of the bearing ring 14 and in conjunction with the annular flange 13 prevents axial displacement of the bearing ring 14. Sleeve 9 is rotatably mounted in a bearing 16 of the bearing ring 14, therefore it will be seen that the sprocket end of the sleeve 9 is supported in a manner whereby it will easily rotate independent of the casing 1. The other end of the sleeve 9 is rotatably mounted in a bearing 17 of the frusto conically shaped spout 6, which spout and the spout 4 do not rotate, but are stationary with the casing 1.

Disposed within the discharge spout 6 is a spider 18, in a bearing 19 of which is rotatably mounted the hollow shaft 20, which extends through the chamber 10 of the sleeve 9 and is provided with a feed worm 21, which feed worm and hollow shaft 20 are rotated by means of a sprocket 22 carried by the outer end of the shaft 20, therefore it will be seen when food, for instance fish, is placed in the hopper 23 of the extension casing 24 carried by the spider 15, the feed worm 21 will force the same through the chamber 10 and discharge spout 7 and form a core within a tubular food member formed by the worm 11 forcing food, for instance rice through the annular discharge port 8. Although rice and fish have been described and an annular form set forth, it is obvious that various kinds of foods may be used, and the discharge spout varied in shape for varying the cross sectional shape of the food products made by the machine. It will be noted the extension casing 24 engages one end of the rotatable sleeve 9 at 25 and prevents axial movement of the sleeve 25 in one direction, and the conically shaped discharge spout 6 engages the other end of the sleeve at 26 and prevents axial displacement of the sleeve 9 in the other direction, therefore it will be seen the sleeve 9 is not only supported in bearings, that it may easily rotate, but it will be prevented from axial displacement. Disposed against the outer end of the extension casing 14 is a disc 27, which is provided with an annular flange 28, which extends into the end of the sleeve 7 and in a bearing 29 of which disc the hollow shaft 20 is rotatably mounted. The disc 27 is held in place by means of the removable cap 30 threaded on the outer end of the extension casing 14, therefore it will be seen that the cap may be easily removed, as well as the member 4, for allowing easy and quick disassembling of the machine for cleaning or repair purposes, particularly for cleaning, as health regulations are very rigid on food machinery, especially where used in public.

From the above it will be seen that a food roll forming machine is provided, which is simple in construction, easily assembled, and provided with means whereby the machine will form a food core having a casing of food.

The invention having been set forth what is claimed as new and useful is:—

1. The combination with a food roll forming machine comprising a casing having a food receiving chamber therein, a sleeve rotatably mounted in said casing and having a feed worm, a shaft rotatably mounted within the sleeve and having a feed worm, of a cap detachably connected to one end of the casing, said cap comprising an outer wall, a conically shaped inner wall, a spider within the inner wall, a bearing in said spider for one end of the shaft, a bearing in the inner end of the inner sleeve in which the worm carrying sleeve is rotatably mounted, a disc disposed within the other end of the casing and in which the sleeve is rotatably mounted, a spider threaded on the casing and engaging the outer side of the disc, a rib carried by the sleeve and engaging the inner side of the disc, an extension casing carried by said last named spider and through which the shaft extends, a bearing disc carried by the end of the extension casing and in which the shaft is rotatably mounted, a drive sprocket within the last named spider and carried by the rotatable sleeve and a drive sprocket carried by the shaft.

2. A food roll forming machine comprising an outer cylindrical casing having a chamber therein, a rotatable sleeve within the chamber of the outer casing, a worm carried by the outer periphery of said rotatable sleeve, a supporting bearing for said sleeve and in which said sleeve is rotatably mounted, an axially disposed shaft within the sleeve, a worm carried by said axially disposed shaft, said axially disposed shaft terminating beyond the end of the sleeve, a conically shaped sleeve threaded on the outer casing, a second conically shaped sleeve within the first mentioned conically shaped sleeve, supporting one end of the sleeve and in which the adjacent end of the sleeve is rotatably mounted, integral members maintaining said conically shaped sleeves in spaced relation, a spider within the second conically shaped sleeve and spaced from the ends thereof, said axially disposed shaft being rotatably mounted in a bearing of said spider.

3. A food roll forming machine comprising inner and outer casings, said inner casing being rotatably mounted, a worm carried by said inner casing, a shaft within the inner casing, a worm carried by said shaft, a conically shaped sleeve threaded on the outer casing, a second conically shaped sleeve within the first mentioned conically shaped sleeve and in which the inner casing is rotatably mounted, means for maintaining the conically shaped sleeves in spaced relation, a spider within the second mentioned conically shaped sleeve, said shaft extending beyond the end of the inner casing and rotatably mounted in said spider.

In testimony whereof I have signed my name to this specification.

HARRY U. BOLLINGER.